US012592884B2

(12) United States Patent
Bandekar et al.

(10) Patent No.: US 12,592,884 B2
(45) Date of Patent: Mar. 31, 2026

(54) SHARING EGRESS TUNNEL HEADER REWRITE TABLE ENTRIES ACROSS VIRTUAL PRIVATE NETWORK (VPN) TUNNELS

(71) Applicant: Arista Networks, Inc., Santa Clara, CA (US)

(72) Inventors: Vishal Bandekar, Bangalore (IN); Binoshmon Tb, Bangalore (IN); Basil Saji, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 40 days.

(21) Appl. No.: 18/395,076

(22) Filed: Dec. 22, 2023

(65) Prior Publication Data

US 2025/0211528 A1 Jun. 26, 2025

(51) Int. Cl.
H04L 45/745 (2022.01)
H04L 45/00 (2022.01)

(52) U.S. Cl.
CPC .......... H04L 45/745 (2013.01); H04L 45/566 (2013.01)

(58) Field of Classification Search
CPC ............................. H04L 45/745; H04L 45/566
See application file for complete search history.

(56) References Cited

U.S. PATENT DOCUMENTS

| | | | | |
|---|---|---|---|---|
| 7,260,097 B2 * | 8/2007 | Casey | ................... | H04L 45/502 |
| | | | | 370/392 |
| 10,659,362 B1 * | 5/2020 | Sellappa | ............... | H04L 45/243 |
| 2003/0088699 A1 * | 5/2003 | Luciani | ................... | H04L 45/50 |
| | | | | 709/243 |
| 2017/0264552 A1 * | 9/2017 | Duda | ...................... | H04L 45/20 |
| 2021/0044516 A1 * | 2/2021 | Sellappa | ................ | H04L 45/24 |
| 2021/0367867 A1 * | 11/2021 | Arora | ...................... | H04L 45/50 |
| 2022/0210072 A1 * | 6/2022 | Dutta | .................... | H04L 47/125 |
| 2024/0121177 A1 * | 4/2024 | Li | .......................... | H04L 45/247 |
| 2024/0195741 A1 * | 6/2024 | Zhang | .................. | H04L 45/484 |
| 2025/0211528 A1 * | 6/2025 | Bandekar | ............. | H04L 45/745 |

* cited by examiner

*Primary Examiner* — Jerry B Dennison
(74) *Attorney, Agent, or Firm* — Tianyi He

(57) ABSTRACT

A method of forwarding a data packet includes, in part, receiving the data packet at an ingress interface, reordering entries of the data packet such that a first forwarding equivalence class (FEC), indexed by a first forwarding lookup table, is caused to point to a virtual private network (VPN) identifier associated with a tunnel through which the data packet is to be forwarded. The reordering of the entries causes a second FEC to point to a multitude of common tunnel header entries. The second FEC is indexed by the first FEC and has a lower level than the first FEC. The data packet with the reordered entries is forwarded through the tunnel. The egress tunnel header rewrite table entries are also reordered in accordance with which the data packet is forwarded.

20 Claims, 8 Drawing Sheets

400

EGRESS HEADER
REWRITE ENTRIES 402

IPv6 TUNNEL 412 → SRH 416 → SID (n) 418 → • • • → SID (1) 420

DUPLICATED FOR EVERY TUNNEL

SID (0) /VPN SID 422

L2 REWRITE / ARP 424

EGRESS ENTRY 2

EGRESS ENTRY 1

EGRESS ENTRY 3

FEC 1 404

FEC 2 402

FEC 3 406

L2/L3 FORWARDING TABLE 410

802 ── RECEIVING AN INGRESS DATA PACKET COMPRISING HEADER DATA

804 ── REWRITING THE HEADER DATA ACCORDING TO A HIERARCHY OF A PLURALITY OF CHAINED FECs

806 ── FORWARDING THE DATA PACKET WITH THE REWRITTEN HEADER DATA TO AN EGRESS INTERFACE

SHARING EGRESS TUNNEL HEADER REWRITE TABLE ENTRIES ACROSS VIRTUAL PRIVATE NETWORK (VPN) TUNNELS

BACKGROUND

The present application relates to computer network technology and, more particularly, to storage of routing information in network devices.

In computer networks, interconnected devices may provide switching (e.g., Layer 2 operations of the 7-layer Open Systems Interconnection Model) and/or routing (e.g., Layer 3 operations of the 7-layer Open Systems Interconnection Model) functionality. Some network devices may store routing information in memory for routing data packets in a network. The routing information may be stored in a data structure and the number of entries in the data structure is limited due to size constraints of hardware in the network device. In large networks, this size constraint may reduce routing efficiency and/or limit the design of a network.

BRIEF DESCRIPTION OF THE DRAWINGS

With respect to the discussion to follow, and in particular, to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
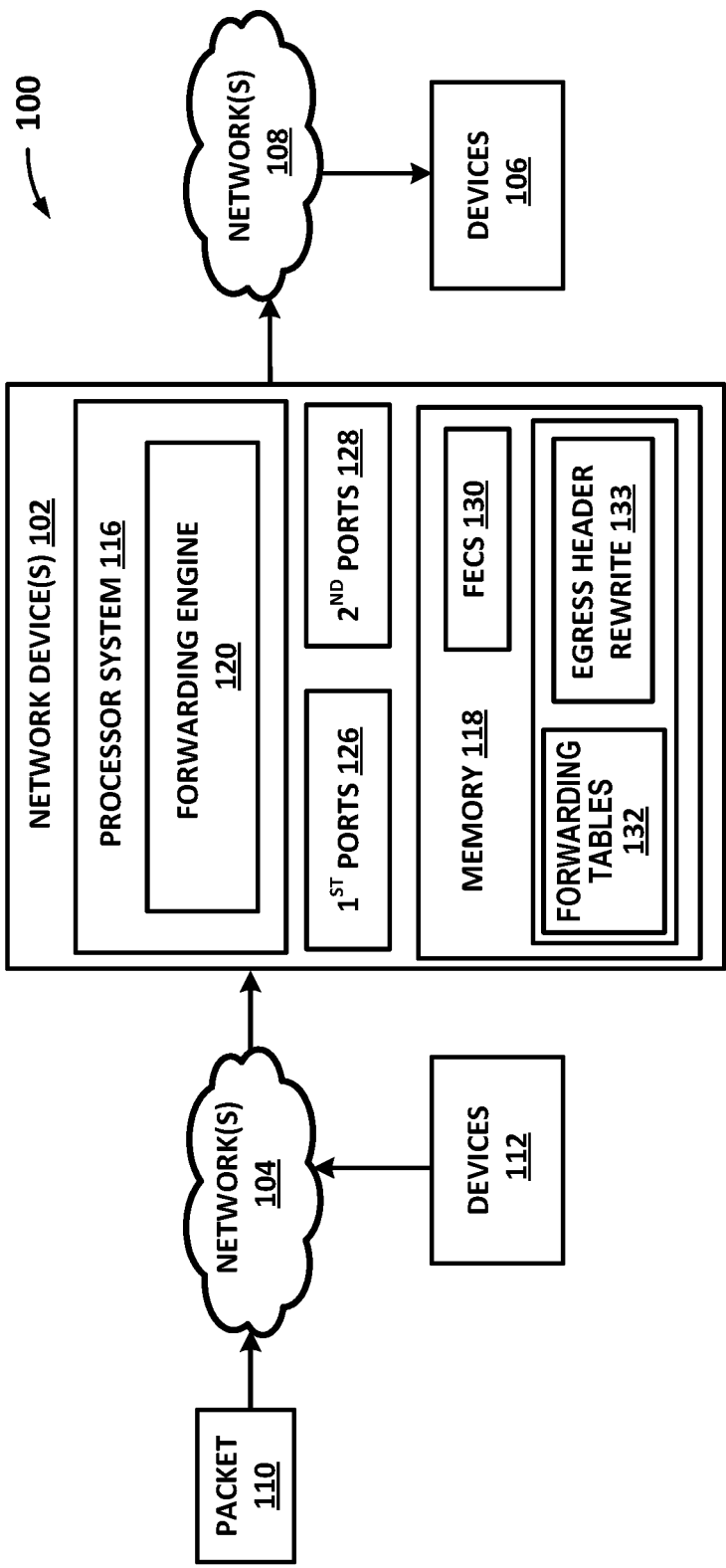
FIG. 1 illustrates the general environment in which a network device processes network data according to one or more implementations.

The present disclosure is directed to forwarding information in network devices. In the following description, for purposes of explanation, numerous examples and specific details are set forth to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

In conventional systems that route packets through tunnels, egress tunnel header rewrite table entries have to be duplicated for each tunnel using a chained group of table entries pointed to by one or more forwarding equivalence classes (FECs). The egress tunnel header rewrite table entries of a packet define, for example, the type of header data (such as the Internet Protocol version 6 (IPv6) of the packet, the length of the segment routing header (SRH) data, the number of nodes remaining in the path before the packet reaches its destination, a multitude of segments through which the packet is to be forwarded by a router, and the like.

Each egress tunnel header rewrite table entry may be pointed to by a FEC. The FEC may point to a single entry in an egress tunnel header rewrite table, or to a group of chained entries in an egress tunnel header rewrite table. Such chaining may be accomplished by virtue of each table entry (except the last one in the chain) maintaining an index to the immediate next entry of the chain. For example, in a conventional system, a chain of entries in an egress tunnel header rewrite table is duplicated for every tunnel. Such duplication results in an increased use of hardware resources, and therefore increases the cost associated with writing and maintaining the entries in an egress tunnel header rewrite table.

In accordance with one embodiment of the present disclosure, egress tunnel header rewrite table entries that are common across tunnels are shared among the tunnels, thereby reducing the hardware resource and the cost associated with maintaining the entries. Accordingly, the packets are forwarded using reordered or rearranged egress tunnel header rewrite table entries to enable sharing of the table entries. Embodiments of the present disclosure may be performed by a programmable application specific integrated circuit (ASIC), or any other circuitry or a network device.

To reorder the egress tunnel header rewrite entries so as to share the entries that are common to the tunnels being used to forward the packets, in one embodiment, a router separates a virtual private network (VPN) identifier entry from the rest of the egress tunnel header rewrite entries, such as the segment routing header (SRH) entry, and the IPv6 egress tunnel header entry. In one embodiment, the VPN identifier is pointed to directly by a top level FEC, an index to which is obtained from a forwarding table entry. The chain of egress tunnel header rewrite entries that are common to the tunnels are pointed to by a lower level FEC.

FIG. 1 illustrates a network communication system (hereinafter system) 100 in which a network device processes network data according to one or more embodiments of the present disclosure. System 100 includes network device 102 that receives data transmitted over one or more networks 104, processes the data, and sends the processed data to one or more devices 106 over one or more second networks 108. Non-limiting examples of device(s) 106 include servers and host devices (e.g., laptops, tablet computers, mobile devices). One or more devices 106 may be connected in a sub-network.

One or more networks 104 include a Layer 3 network over which network device 102 receives a data packet 110 sent by device 112. Device 112 may be a network device in Layer 3 or a network layer of an Open System Interconnect (OSI) model. For instance, device 112 may be a network switch performing intra-network (e.g., intra-virtual local area network) operations, such as operations involving a label switching protocol.

One or more networks 108 include a Layer 2 network over which network device 102 sends a data packet to one or more devices 106. Network device 102 may be located at an edge of the Layer 2 network(s) over which data packet 110 is transmitted. The Layer 3 network(s) of one or more networks 104 may be a network external to the Layer 2 network of one or more networks 108. Data packet 110 may include a Layer 3 address, such as Internet Protocol (IP) addresses. Network device 102 may also transmit packets via a Layer 2 network of one or more networks 108 between devices 106. The data packet transmitted may include a Layer 2 address, such as a media access control (MAC) address. Network device 102 may implement Layer 2 addresses for communications with the one or more devices 106 and may operate as a network switch.

The network device 102 includes one or more processors 116 and memory 118 storing routing information. One or more processors 116 are configured to implement a forwarding engine 120 for forwarding data packets based on the forwarding information. Memory 118 includes modular memory storing sets of FECs 130, as well as hardware forwarding tables 132. The FECs 130 may comprise a hierarchy (e.g. multiple chained, levels of FECs). An implementation of the disclosure reorders, or otherwise reorganizes, egress tunnel header rewrite table entries 133 of the forwarding tables 132 using the hierarchy of FECs 130 to reduce the duplication of entries. Reducing the duplication may, in turn, reduce memory and processing hardware needed for VPN routing. The FECs 130 and forwarding tables 132 may be stored in memory accessible by software operating on network device 102 (e.g., main memory of the network device 102) and/or be stored in hardware memory, such as specialized fast-performing hardware data s tructure(s) (e.g., ternary content-addressable memory (TCAM), a multi-level Trie).

In general, the network device 102 forms part of a computing network that stores routing information in the memory 118 for routing data packets through the network. Certain generations of network device hardware have modular memory for storing routing information in hardware. The routing information, more specifically, may be stored in a data structure (e.g., the forwarding tables 132) and may be accessed based on an algorithm that identifies a match between an address and certain information stored in the data structure.

Each entry in the forwarding tables may include an address that identifies the destination of the packet, and the next-hop representing the next immediate router or gateway in the path to be taken by the packet as it travels through the network to reach its destination. As the size of the number of available addresses grows over time, so too does the size of forwarding tables and the amount of memory involved in storing the forwarding tables.

The memory 118 may include a plurality of different memory types, such as volatile memory (e.g., cache memory, random-access memory) and/or non-volatile memory (e.g., solid-state memory). The memory 118 may store executable instructions that, as a result of execution by some of one or more processors 116, cause network device 102 to perform as described herein. Memory 118 may store a modular database that facilitates scaling of the forwarding tables 132.

The processor system 116 may include one or more switching processor devices (e.g., Application Specific Integrated Circuits, System-on-Chips, Field Programmable Gate Arrays). A forwarding engine 120 (shown as included in processor system 116) processes packets that are transmitted on a Layer 3 network or a Layer 2 network. The forwarding engine 120 may receive data packet 110, which includes a source address and a destination address, and determine a next-hop address for data packet 110 based on the FECs 130 and forwarding tables 132.

Network device 102 includes a plurality of network interfaces that include first port 126 on which data packet 110 is received. The plurality of network interfaces of network device 102 also include a plurality of second ports 128 for sending the data packet to device(s) 106. Network device 102 selects one of a plurality of second ports 128 from which to send data packet 110 based on a destination address of data packet 110. In some embodiments, individual ports of second ports 128 are coupled to a corresponding subnet, which may be a destination subnet for data packet 110. Forwarding engine 120 uses the forwarding tables 132 (described further below) to determine which of the plurality of second ports 128 to use to transmit data packet 110.

The network device 102 may store forwarding table entries according to routing protocols such as routing information protocol (RIP), border gateway protocol (BGP), open shortest path first (OSPF), intermediate system-intermediate system (IS-IS), interior gateway routing protocol (IGRP), enhanced IGRP (EIGRP), and any/or other type of unicast routing protocol known in the art.

The network device 102 may be used to transmit packets using Layer 3 addresses or transmit packets using Layer 2 addresses. Layer 3 addresses correspond to entries for transmitting packets using Layer 3 protocols and Layer 2 addresses correspond to entries for transmitting packets using Layer 2 protocols.

Figure 2:
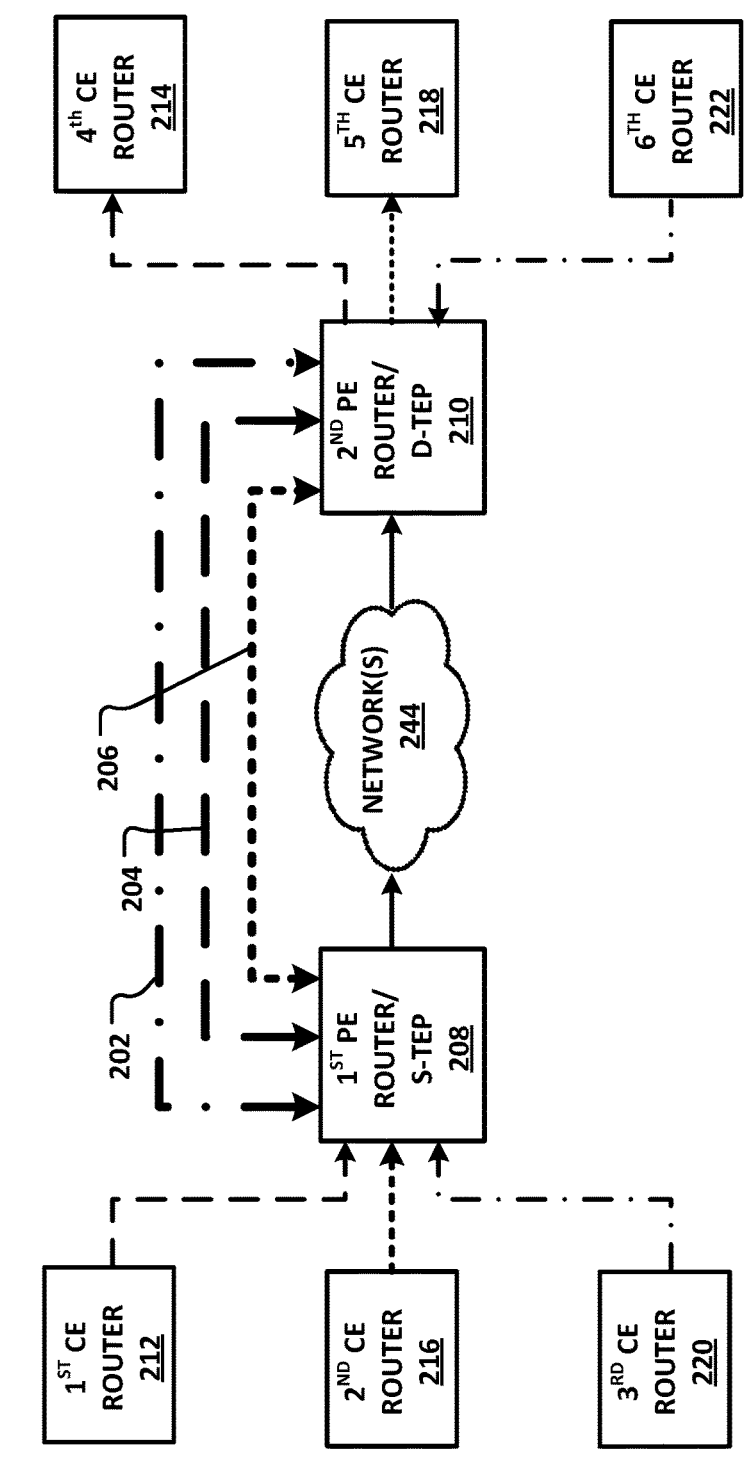
FIG. 2 illustrates a diagram of a network topology that includes a plurality of virtual private network (VPN) tunnels positioned between two tunnel endpoints comprising a first and second provider edge routers.

FIG. 2 illustrates a diagram of an L3 VPN/L2 VPN network topology 200 that includes a plurality of VPN tunnels 202, 204, 206. The plurality of VPN tunnels 202, 204, 206 may be positioned between two tunnel endpoints comprising a first provider edge router 208 and a second provider edge router 210 that are in communication via network 244. The first provider edge router 208 enables the formation of a source tunnel end point (S-TEP), at which encapsulation takes place. As described hereinbelow in greater detail, the S-TEP may encapsulate an original payload within a tunnel header. The second provider edge router 210 may comprise a destination tunnel end point (D-TEP) at which decapsulation occurs.

The plurality of tunnels 202, 204, 206, may be established between the same two tunnel endpoints (i.e., at provider edge routers 208 and 210 of FIG. 2) and along the same path. Each tunnel has a different VPN identifier that provides information to the second provider edge router 210 about how to forward the received packets after tunnel decapsulation. As described hereinbelow, in accordance with embodiments of the present disclosure, the VPN identifier associated with each tunnel is pointed to by a first FEC. The remaining tunnel header data that are common to different tunnels are shared and pointed to by one or more other FECs. In other words, the common tunnel header data are shared and, therefore, not duplicated. These features reduce the hardware resources used in processing and forwarding the packets through different tunnels.

In the example of FIG. 2, data packet traffic from a first customer edge router 212 is shown as being forwarded through the VPN tunnel 204 to arrive at a fourth customer edge router 214. An example customer edge (CE) device is a router located on a customer premises that provides an interface between a customer's network and the provider's core network. The data packet traffic traveling over the VPN tunnel 204 includes a VPN identifier disposed in the tunnel header of the data packet that may indicate an egress interface from the second provider edge router 210. Based on the VPN identifier disposed in the tunnel header data associated with VPN tunnel 204, provider edge router 210 performs a forwarding lookup, after tunnel decapsulation, in order to determine the node to which the packets received via VPN tunnel 204 are to be forwarded.

As is additionally shown in FIG. 2, data packet traffic from a second customer edge router 216 is shown as being forwarded through the VPN tunnel 206 to arrive at a fifth customer edge router 218. As with the traffic forwarded through VPN tunnel 204, the data packet traffic traveling over the VPN tunnel 206 includes a VPN identifier disposed in the tunnel header of the data packet that may indicate the egress interface from the second provider edge router 210. Based on the VPN identifier disposed in the tunnel header data associated with VPN tunnel 206, provider edge router 210 performs a forwarding lookup, after tunnel decapsulation, in order to determine the node to which the packets received via VPN tunnel 206 are to be forwarded.

Similarly, data packet traffic from a third customer edge router 220 is shown as being forwarded through the VPN tunnel 202 to arrive at a sixth customer edge router 222. As with the traffic forwarded through VPN tunnels 204 and 206, the data packet traffic traveling over the VPN tunnel 202 includes a VPN identifier disposed in the tunnel header of the data packet that may indicate the egress interface from the second provider edge router 210. Based on the VPN identifier disposed in the tunnel header data associated with VPN tunnel 202, provider edge router 210 performs a forwarding lookup, after tunnel decapsulation, in order to determine the node to which the packets received via VPN tunnel 202 are to be forwarded.

Figure 3:
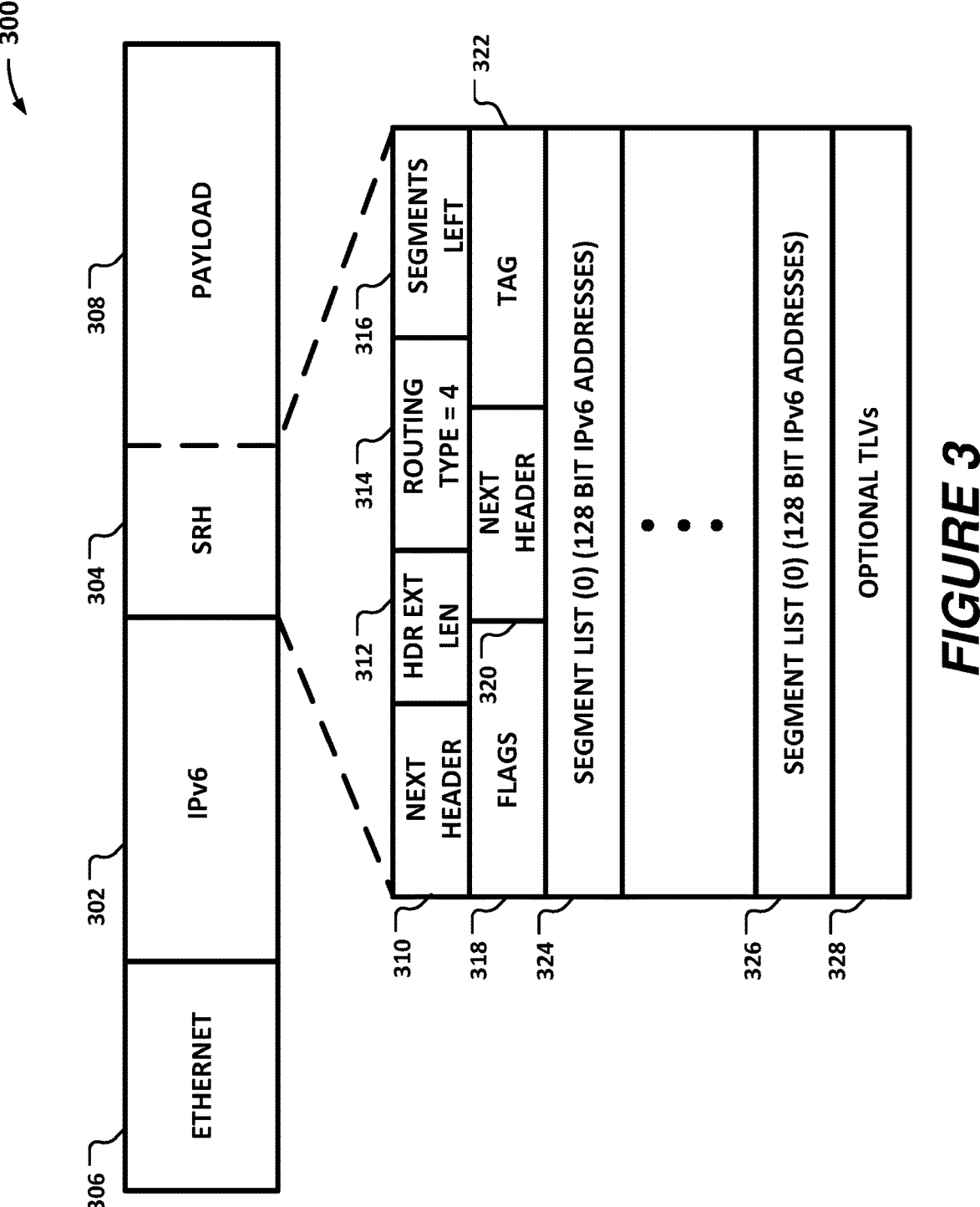
FIG. 3 is a block diagram of a data packet that includes an encapsulated tunnel header as may be added by a source tunnel end point for a segment routing tunnel.

FIG. 3 is a block diagram of a data packet 300 that includes an encapsulated tunnel header 302 and 304 as may be added by an S-TEP for a packet to be tunneled. For instance, the first PE router 208 of the system 200 of FIG. 2 may encapsulate the header portion of the data packets. In the particular implementation of FIG. 3, the tunnel headers added by the S-TEP are for a Segment Routing Internet Protocol version 6 (SRv6) case. SRv6 is an Internet Protocol (IP) that combines IPv6 with segment routing (SR).

The encapsulated tunnel header of FIG. 3 may comprise portions 302 and 304. Portion 302 may comprise Internet Protocol version 6 (Ipv6) header data, and portion 304 may include segment routing header (SRH) data. The packet may additionally include Ethernet 306 and payload data 308.

The illustrative block diagram of FIG. 3 further breaks out in dashed lines illustrative components of the SRH data 304. For example, the SRH data 304 includes a top row comprising a next header field 310 and a header extension length field 312, which defines the length of the SRH header in 8-byte units. A routing type field 314 allows multiple types to be defined. A segments left field 316 may specify a number of explicit nodes remaining in the path until the destination. A next header field 320 may specify the next header in a packet. The SRH 304 may additionally include a field 322 that includes a network tag. Segment list fields 324, 326 may comprise source routing of traffic performed by a router and encoded as a list of segments. The SRH data 304 may additionally include optional type length values (TLVs) 328 comprising an encoding scheme used for optional elements. SRH data 304 is also shown as including an 8-bit flag 318.

Figure 4:
FIG. 4 is a block diagram depicting an illustrative organization of egress tunnel header rewrite table entries that incorporates a hierarchy of FECs to reorder the egress tunnel header rewrite table entries.

FIG. 4 is a block diagram depicting an illustrative organization of egress tunnel header rewrite table entries that incorporates a hierarchy (e.g., three levels in this example) of FECs. As is described in detail below, the egress tunnel header rewrite table entries are reordered so as to be pointed by the FECs in the hierarchy. Accordingly, the duplication of common tunnel header entries is dispensed with, thereby reducing the memory and processing hardware that would be otherwise required for forwarding of the packets.

As is described below with reference to FIG. 4, each egress entry may be pointed to by an FEC. The FEC may point to a single entry in one of the egress tunnel header rewrite tables, or to a group of entries that are chained together in the tables. Such chaining may be accomplished by ensuring that each table entry (except the last one in the chain) maintains an index to the immediate next entry in the chain.

As shown in FIG. 4, the top level FEC 404 is shown as pointing to the VPN segment ID (SID) information 422. The VPN SID information 422 is understood to refer to the portion of the tunnel header data that is unique to each tunnel. Because the top level FEC 404 points directly to the VPN SID information 422, embodiments of the present disclosure do not replicate the common tunnel header data entries, such as internet protocol version 6 (IPv6) entry 412, SRH entry 416, and SID entries starting at 418 and ending at 420. Therefore, the VPN SID entry is allocated for each tunnel separately.

Second level FEC 402 is shown as pointing to IPv6 tunnel header data entry 412 which forms a chain with tunnel header data entries 416, 418, 420 that are common to all the VPN tunnels. By sharing common egress tunnel header rewrite table entries across multiple tunnels, embodiments of the present disclosure provide substantial savings in hardware resources used to forward the packets through the tunnels. The third level FEC 406 is shown as pointing to a Layer 2 rewrite entry.

Although embodiments of the present disclosure are described with reference to SRv6 VPN tunnels, it is understood that embodiments of the present disclosure equally apply to other VPN tunnels, such as SRv6 traffic engineering (TE) tunnels, or SR multi-protocol label switching (MPLS). For example, when applied to SRv6 TE tunnels, the second level FEC (e.g., FEC 402 of FIG. 4) points to the last SID in the segment list.

Figure 5:
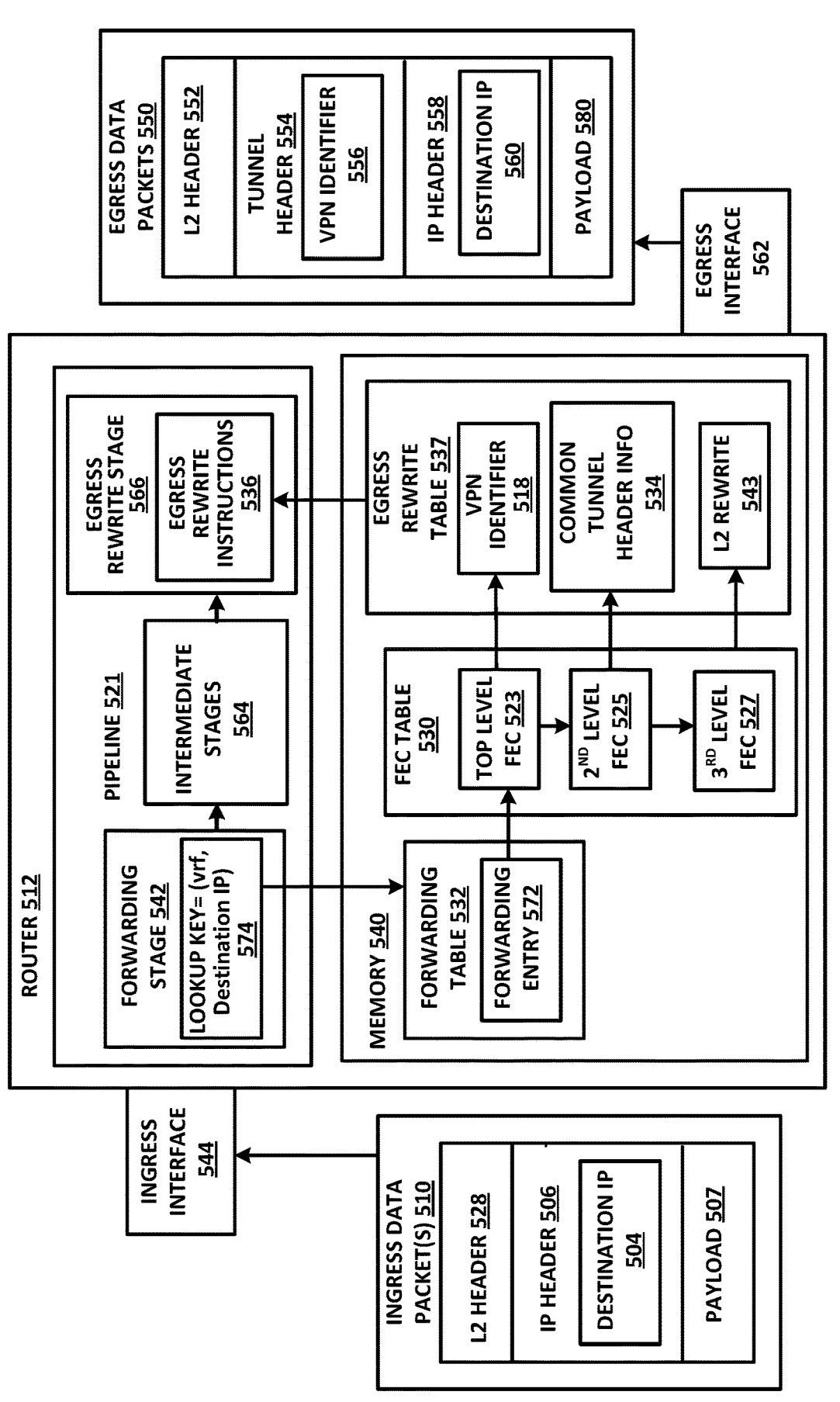
FIG. 5 is a block diagram of an implementation of a system configured to forward a plurality of data packets using at least one router.

FIG. 5 is a block diagram of an implementation of a system 500 configured to forward a plurality of ingress data packets 510 using at least one router 512. Each ingress data packet 510 is shown as including an L2 header 528, an IP header 506, a destination IP address 504 to which the packet is forwarded, and a payload 507. The illustrative system 500 generally shows an ingress data packet 510 to be bridged, or routed, into a VPN tunnel via router 512's ingress interface 544, which is configured, in part, to collect the virtual routing and forwarding (VRF) identification of the ingress data packets. The router 512 may perform a forwarding lookup at a forwarding stage 542 on the ingress data packet 510. The forwarding stage 542 is shown as including, in part, a lookup key 574 that comprises the VRF and the destination IP address of the ingress data packets. An ingress pipeline

521 of the router 512 may be used to fetch an FEC entry chain in an FEC table 530. Each FEC entry in the FEC entry chain may include indices into the egress rewrite table 537 needed to rewrite the ingress packet for forwarding into the VPN tunnel.

A top level FEC entry 523 may point to a VPN rewrite entry (e.g., VPN ID 518). A second level FEC entry 525 may point to a common tunnel header information 534, and a third level FEC entry 527 may point to a Layer 2 (L2) header rewrite entry 543.

The router 512 may convey the ingress data packet 510 along the pipeline 521, and via intermediate stage 564 of pipeline 521, with the rewrite indices conveyed by egress rewrite instructions 536 (of egress rewrite stage 566) using egress rewrite table 537. Processes may rearrange the rewrite entries based on relevant ordering. As explained herein, the order may be accomplished by the topmost level FEC entry 523 pointing to the VPN 518, and the second level FEC entry 525 pointing to the common tunnel header information 534. The third level FEC entry 527 may point to the L2 rewrite entry 543.

Headers may be constructed using the egress rewrite instructions 536 based on the FEC pointer designations. The resultant egress packet 550 may then be sent out via the egress interface 562 of the router 512. Egress data packet 550 is shown as including, in part, an L2 header 552, a tunnel header 554 including a VPN identifier 556, an IP header 558 including a destination IP 560, and payload 580. Egress data packet 550 is received from egress interface 562 of router 512.

The system 500 may allocate the common tunnel header information 534 separately from VPN identifier 518 so that the common tunnel header information 534 may be pointed to and reused, rather than replicated. As illustrated, a memory 540 stores firmware and algorithms to reorganize the header rewrite entries of the data packets 510 to enable a more efficient use of hardware table entries. In one example, the VPN identifier 518 may be mapped directly to (i.e., pointed by) the top level FEC 523 of a FEC table 530 that has been obtained from a forwarding entry 572 of a forwarding table 532. The common tunnel header information 534 does not need to be replicated. Instead, the entry storing the common tunnel header information 534 may be mapped to the lower level FEC 527 via an FEC hierarchy 563 of the FEC table 530. This feature allows the table entries that are common to be shared across tunnels. Only the entry storing VPN identifiers 518 is additionally allocated for each VPN tunnel. Although the FEC entry resolution results in egress entries being generated in a different order, the router 512 is programmed to execute the egress rewrite instructions 536 to process the egress tunnel header rewrite entries in the correct order.

Figure 6:
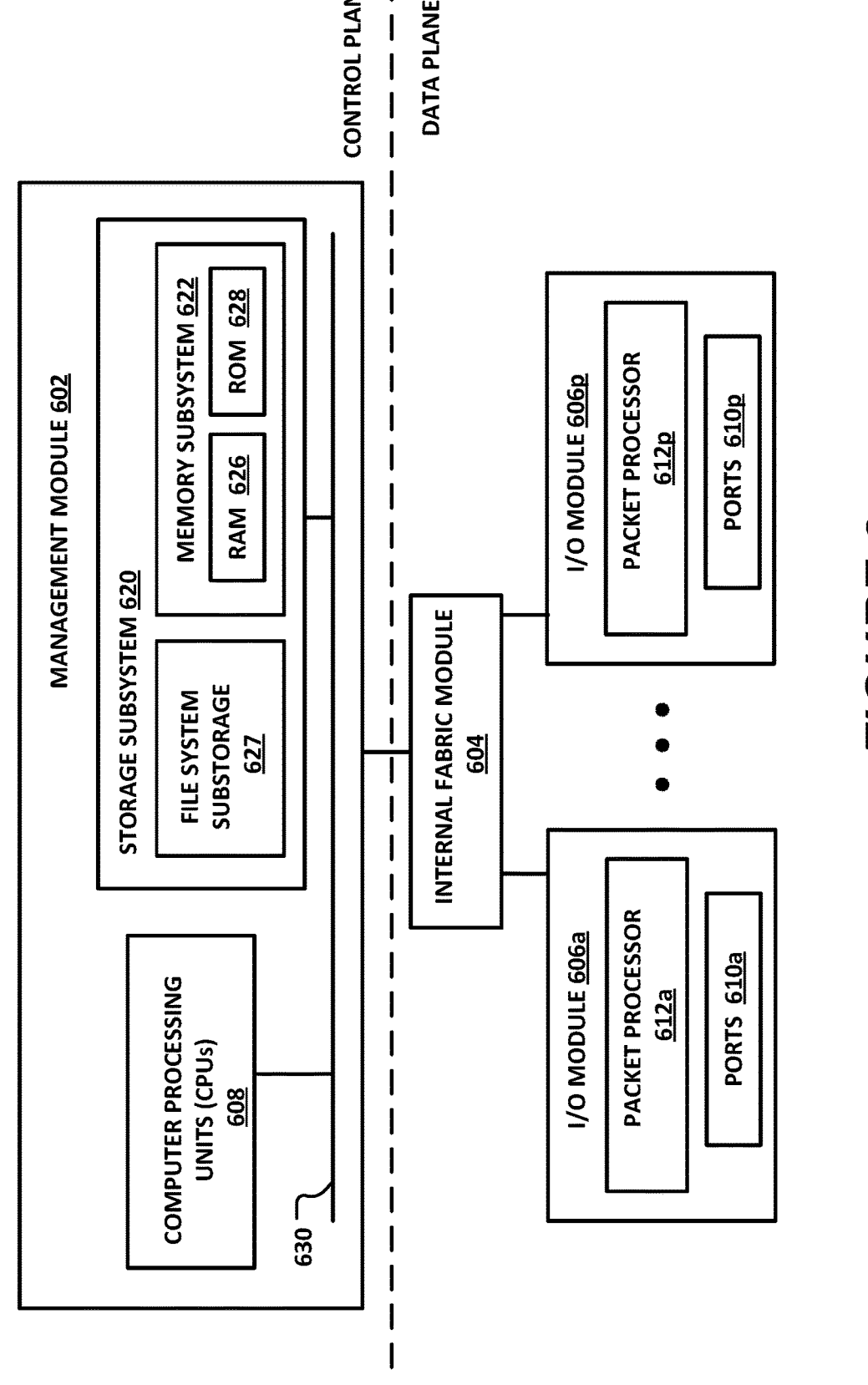
FIG. 6 illustrates a network device that is adapted to operate according to one or more examples of the present disclosure.

FIG. 6 illustrates network device 600 that is adapted to operate according to one or more embodiments of the present disclosure. Network device 600 may be a switch or a router, for example. As shown, network device 600 can include management module 602, internal fabric module 604, and one or more I/O modules 606a-606p. Management module 602 may operate in a control plane (also referred to as control layer) of network device 600 and can include one or more management CPUs 608 for managing and controlling operation of network device 600 in accordance with the present disclosure. Each management CPU 608 can be a general-purpose processor, such as an Intel®/AMD® x86-64 or ARM® processor, which operates under the control of software stored in memory, such as storage subsystem 620 and memory subsystem 622, which may include read-only memory 628 and/or random-access memory 626, and/or file storage subsystem 627. In some embodiments, CPU 608 may include control circuitry, and may include or be coupled to a non-transitory storage medium storing encoded instructions that cause CPU 608 to perform operations described herein. In some embodiments, the non-transitory storage medium may include encoded logic or hardwired logic for controlling operation of CPU 608. The control plane refers to all the functions and processes that determine which path to use, such as routing protocols, spanning tree, and the like. Each network device 600 can include multiple elements that may be electrically coupled via a bus 630.

Internal fabric module 604 and I/O modules 606a-606p collectively represent the data plane of network device 600 (also referred to as data layer, forwarding plane, etc.) Internal fabric module 604 is configured to interconnect the various other modules of network device 600. Each I/O module 606a-606p includes one or more input/output ports 610a-610p that are used by network device 600 to send and receive network packets. Each I/O module 606a-606p can also include packet processor 612a-612p. Each packet processor 612a-612p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Figure 7:
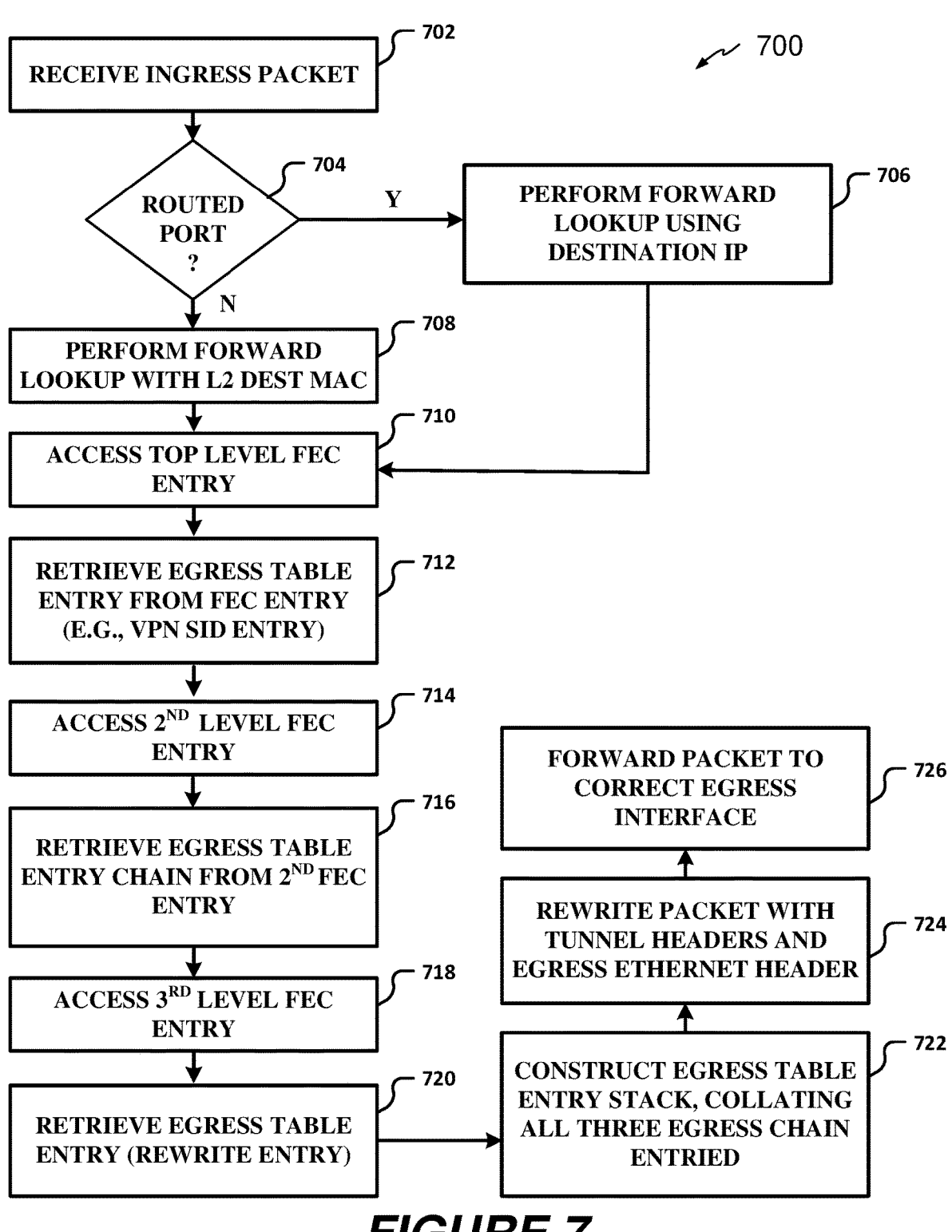
FIG. 7 is a flow diagram of an embodiment of a method of forwarding data packets in a manner that includes using a hierarchy of FECs to reorder and share the egress tunnel header rewrite table entries.

FIG. 7 is a flow diagram of an embodiment of a method 700 in a manner that includes using a hierarchy of FECs to share egress tunnel header rewrite table entries. The method 700 may be performed by any of the systems shown and described in preceding figures. For illustrative and continuity purposes, however, numerous references to the system 500 of FIG. 5 may be used to explain the processes associated with the embodiment of the method 700.

As explained in more detail herein, the method 700 generally includes receiving an ingress packet to be bridged, or routed into a VPN tunnel. The method 700 may further include performing a forwarding lookup on the ingress packet in the ingress pipeline to fetch an FEC entry chain. The FEC entry chain may include indices into the rewrite entries needed to rewrite the ingress packet to forward into the VPN tunnel. A top level FEC entry may point to a VPN rewrite entry. A second level FEC entry may point to a common tunnel rewrite entry, and a third level FEC entry may point to an L2 header rewrite entry. The method of an implementation may further include conveying the ingress data packet from the ingress pipeline to the egress pipeline along with the rewrite indices conveyed in metadata. In a pre-processing stage of the egress pipeline, processes may rearrange the rewrite entries based on relevant ordering. As explained herein, the order may be accomplished by the topmost level FEC entry pointing to the common tunnel rewrite entry, and the second level FEC entry pointing to the VPN rewrite entry. A third level FEC entry may point to the L2 header rewrite entry. The packet may be conveyed to rewrite stages. At the rewrite stages, the headers may be constructed based on the reordered entries, as per the above, illustrative FEC pointer designations. The resultant egress packet may then be sent out via the egress interface of the router.

Turning more particularly to the flow diagram, the method at 702 may include receiving an ingress packet to be forwarded into a VPN tunnel. For example, the ingress packet 510 of FIG. 5 may be received at the ingress interface 544 of the router 512.

At 704, the method 700 may include determining whether the ingress packet includes routed port information. If so, the method 700 may include performing at 706 a forwarding lookup using the destination IP address. For instance, the router 512 of FIG. 5 may use the destination IP address 504 of the ingress data packet 510 during the forwarding stage 542.

Alternatively at 708, the method 700 may include performing a forwarding lookup with an L2 destination MAC address. In an example, the router 512 of FIG. 5 may use the L2 destination MAC address of the ingress data packet 510 during the forwarding stage 542.

The forwarding lookup at either 706 or 708 may be used to fetch an FEC entry chain. As explained herein, the FEC entry chain may include indices into the rewrite entries needed to rewrite the ingress packet to forward into the VPN tunnel. At 710, the method may include accessing a topmost or top level FEC. The top level FEC entry may point to a VPN rewrite entry, which may be retrieved at 712. In the example of FIG. 5, the top level FEC entry 523 may point to the VPN ID 518.

The VPN ID entry may be retrieved at 712, and the method 700 may access a second level FEC entry at 714. As shown in FIG. 5, the second level FEC entry 525 may point to the common tunnel rewrite entry 524.

At 716, the router may retrieve the egress table entry chain from second FEC entry. The egress table entry chain may include an IPV6 tunnel entry and SRH entries.

The method 700 may access at 718 the third level FEC entry 527. As depicted in FIG. 5, the third level FEC entry 527 may point to a Layer 2 header rewrite entry 543, which may be retrieved at 720.

In the pre-processing stages of the egress pipeline (e.g., the egress pipeline 521 of FIG. 5), processes may rearrange the rewrite entries based on relevant ordering. At 722, the router may construct an egress table entry stack, collating all three egress chain entries per the FEC entries' ordering requirements.

At 724, the method 700 may include rewriting the packet with tunnel headers and egress Ethernet header, and the packet may be forwarded at 726 to the correct egress interface of the router. In terms of the illustrative system 500 of FIG. 5, the headers may be constructed at the egress rewrite instructions 536 based on the reordered entries (e.g., 552, 554, and 558), as per the FEC pointer designations. The egress data packet 550 may be forwarded at 726 to the correct egress interface 562 of the router 512.

Figure 8:
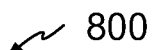
FIG. 8 is a flow diagram of another illustrative embodiment of a method of forwarding a plurality of data packets.
Figure 8:
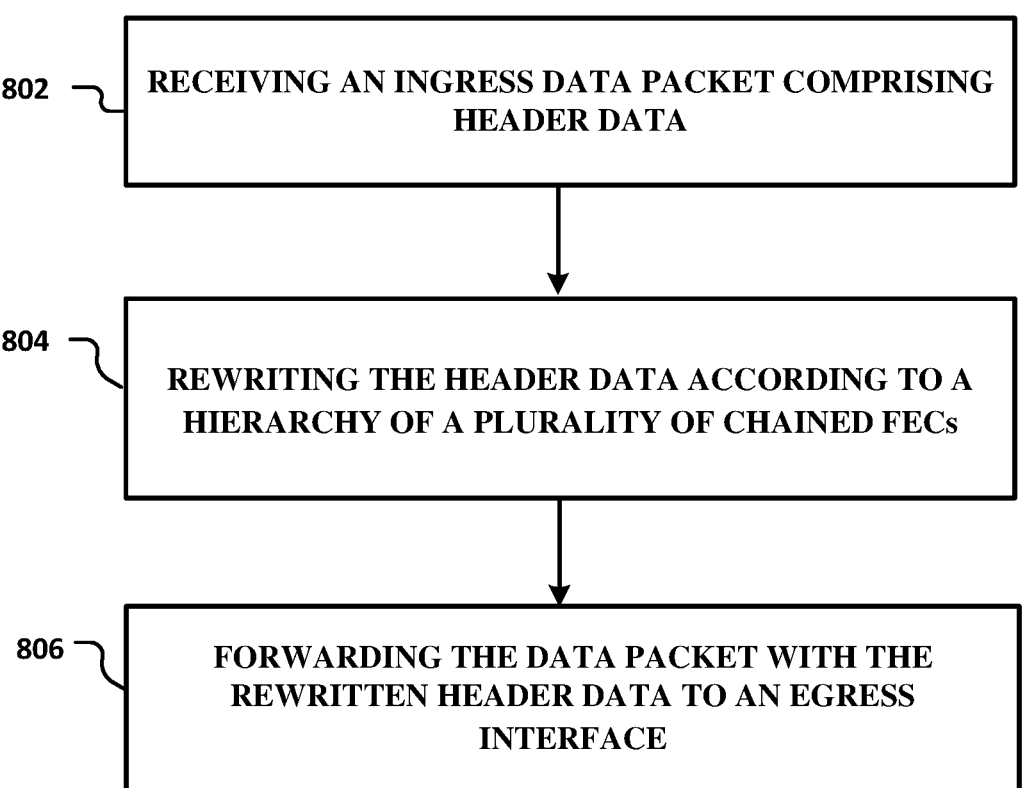

FIG. 8 is a flow diagram of an embodiment of a method 800 of forwarding data packets in a manner that includes using a hierarchy of FECs to share egress tunnel header rewrite table entries. The method 800 may be performed by any of the systems shown and described in preceding figures.

Turning more particularly to the flow diagram, the method 800 may include receiving an ingress data packet comprising header data at 802. For example, the ingress packet 510 of FIG. 5 may be received at the ingress interface 544 of the router 512.

At 804, the method 800 may include rewriting the header data according to a hierarchy of a plurality of levels comprising multiple, chained FECs. In terms of the illustrative system 500 of FIG. 5, the headers may be constructed at the egress rewrite instructions 536 based on the reordered entries (e.g., 552, 554, and 558), as per the FEC pointer designations.

The data packet with the rewritten header data may be forwarded at 806 to an egress interface. For example, the egress data packet 550 of FIG. 5 may be forwarded at 726 of FIG. 7 to the correct egress interface 562 of the router 512.

The various embodiments further can be implemented in a wide variety of operating environments, which in some cases can include one or more computers, computing devices or processing devices, which can be used to operate any one of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any one of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors, and other virtual devices capable of communicating via a network.

Various embodiments of the present disclosure utilize at least one network that would be familiar to those skilled in the art for supporting communications using any one of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infra-red network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Embodiments of this disclosure are described herein, including the best mode known to the inventors for carrying out the disclosure. Variations of those embodiments may become apparent in view of the present disclosure. Moreover, any combination of the above-described elements in all possible variations thereof is encompassed by the scope of the present disclosure unless otherwise indicated herein or otherwise clearly contradicted by context.

The invention claimed is:

1. A method of forwarding a plurality of data packets, the method comprising:

receiving, by a network device, a first data packet at an ingress interface;

reordering, by the network device, entries of the first data packet such that a first forwarding equivalence class (FEC), indexed by a first forwarding lookup table, points to a virtual private network (VPN) identifier associated with a first VPN tunnel through which the first data packet is to be forwarded, and a second FEC points to a plurality of common tunnel header entries shared by a plurality of VPN tunnels including the first VPN tunnel, wherein the second FEC is indexed by the first FEC and has a lower level than the first FEC, wherein the plurality of common tunnel header entries are for common tunnel header data in a tunnel header, and wherein the VPN identifier is disposed in the tunnel header;

encapsulating, by the network device, the first data packet with the tunnel header; and forwarding, by the network device, the first data packet with the reordered entries through the first VPN tunnel.

2. The method of claim 1 further comprising:

reordering egress tunnel header rewrite table entries in accordance with which the first data packet is forwarded.

3. The method of claim 1 further comprising:

receiving a second data packet at the ingress interface;

reordering entries of the second data packet such that a third FEC, indexed by a second forwarding lookup table, points to a VPN identifier associated with a second VPN tunnel, of the plurality of VPN tunnels, through which the second data packet is to be forwarded, and a fourth FEC points to the plurality of common tunnel header entries, wherein the fourth FEC is indexed by the third FEC and has a lower level than the third FEC; and forwarding the second data packet with the reordered entries of the second data packet through the second VPN tunnel, wherein the first and second VPN tunnels have same end points.

4. The method of claim 1 wherein each of at least a subset of the plurality of common tunnel header entries provides an index to another one of the subset of the plurality of common tunnel header entries.

5. The method of claim 4 wherein the plurality of common tunnel header entries is associated with at least one of a layer-2 VPN tunnel or a layer-3 VPN tunnel.

6. The method of claim 1 further comprising:

reordering the entries of the first data packet such that a third FEC, indexed by the second FEC, points to a layer-2 header entry.

7. The method of claim 1 wherein the plurality of common tunnel header entries comprise an Internet Protocol version 6 (IPV6) tunnel header entry, a segment routing header (SRH) entry, and a segment ID (SID) entry.

8. A network device comprising:

an ingress interface;

a memory; and a control system configured to:

receive a first data packet at the ingress interface;

reorder entries of the first data packet such that a first forwarding equivalence class (FEC), indexed by a first forwarding lookup table, points to a virtual private network (VPN) identifier associated with a first VPN tunnel through which the first data packet is to be forwarded, and a second FEC points to a plurality of common tunnel header entries shared by a plurality of VPN tunnels including the first VPN tunnel, wherein the second FEC is indexed by the first FEC and has a lower level than the first FEC, wherein the plurality of common tunnel header entries are for common tunnel header data in a tunnel header, and wherein the VPN identifier is disposed in the tunnel header; and encapsulate the first data packet with the tunnel header; and forward the first data packet with the reordered entries through the first VPN tunnel.

9. The network device of claim 8 wherein the control system is further configured to:

reorder egress tunnel header rewrite table entries in accordance with which the first data packet is forwarded.

10. The network device of claim 8 wherein the control system is further configured to:

receive a second data packet at the ingress interface;

reorder entries of the second data packet such that a third FEC, indexed by a second forwarding lookup table, points to a VPN identifier associated with a second VPN tunnel, of the plurality of VPN tunnels, through which the second data packet is to be forwarded, and a fourth FEC points to the plurality of common tunnel header entries, wherein the fourth FEC is indexed by the third FEC and has a lower level than the third FEC; and forward the second data packet with the reordered entries of the second data packet through the second VPN tunnel, wherein the first and second VPN tunnels have same end points.

11. The network device of claim 8 wherein each of at least a subset of the plurality of common tunnel header entries provides an index to another one of the subset of the plurality of common tunnel header entries.

12. The network device of claim 11 wherein the plurality of common tunnel header entries is associated with at least one of a layer-2 VPN tunnel or a layer-3 VPN tunnel.

13. The network device of claim 8 wherein the control system is further configured to:

reorder the entries of the first data packet such that a third FEC, indexed by the second FEC, points to a layer-2 header entry.

14. The network device of claim 8 wherein the plurality of common tunnel header entries comprise an Internet Protocol version 6 (IPV6) tunnel header entry, a segment routing header (SRH) entry, and a segment ID (SID) entry.

15. A non-transitory computer readable medium comprising stored instructions, which when executed by a processor of a network device, cause the processor to:

receive a first data packet at an ingress interface;

reorder entries of the first data packet such that a first forwarding equivalence class (FEC), indexed by a first forwarding lookup table, points to a virtual private network (VPN) identifier associated with a first VPN tunnel through which the first data packet is to be forwarded, and a second FEC points to a plurality of common tunnel header entries shared by a plurality of VPN tunnels including the first VPN tunnel, wherein the second FEC is indexed by the first FEC and has a lower level than the first FEC, wherein the plurality of common tunnel header entries are for common tunnel header data in a tunnel header, and wherein the VPN identifier is disposed in the tunnel header;

add the tunnel header, including the common tunnel header data and the VPN identifier, to the first data packet; and forward the first data packet with the reordered entries through the first VPN tunnel.

16. The non-transitory computer readable medium of claim 15 wherein the instructions further cause the processor to:

reorder egress tunnel header rewrite table entries in accordance with which the first data packet is forwarded.

17. The non-transitory computer readable medium of claim 15 wherein the instructions further cause the processor to:

receive a second data packet at the ingress interface;

reorder entries of the second data packet such that a third FEC, indexed by a second forwarding lookup table, points to a VPN identifier associated with a second VPN tunnel, of the plurality of VPN tunnels, through which the second data packet is to be forwarded, and a fourth FEC points to the plurality of common tunnel header entries, wherein the fourth FEC is indexed by the third FEC and has a lower level than the third FEC; and forward the second data packet with the reordered entries of the second data packet through the second VPN tunnel, wherein the first and second VPN tunnels have same end points.

18. The non-transitory computer readable medium of claim 15 wherein each of at least a subset of the plurality of common tunnel header entries provides an index to another one of the subset of the plurality of common tunnel header entries.

19. The non-transitory computer readable medium of claim 18 wherein the plurality of common tunnel header entries is associated with at least one of a layer-2 VPN tunnel or a layer-3 VPN tunnel.

20. The non-transitory computer readable medium of claim 15 wherein the instructions further cause the processor to:

reorder the entries of the first data packet such that a third FEC, indexed by the second FEC, points to a layer-2 header entry.

* * * * *